United States Patent [19]
Hopwood et al.

[11] Patent Number: 6,107,801
[45] Date of Patent: Aug. 22, 2000

[54] LOCATING AN INACCESSIBLE OBJECT BY DETECTING HORIZONTAL AND VERTICAL COMPONENTS OF A MAGNETIC FIELD

[75] Inventors: Michael Peter Hopwood, Cambridgeshire; Richard William Fling, Bristol, both of United Kingdom

[73] Assignee: Radiodetection Limited, Bristol, United Kingdom

[21] Appl. No.: 09/168,414

[22] Filed: Oct. 8, 1998

[30] Foreign Application Priority Data

Oct. 8, 1997 [GB] United Kingdom ............... 9721377

[51] Int. Cl.[7] ............... G01V 3/08; G01V 3/38; E21B 47/024
[52] U.S. Cl. ............ 324/326; 324/207.17; 324/247; 175/45
[58] Field of Search ............ 324/326–329, 324/345, 346, 207.17, 207.26, 247; 175/26, 45

[56] References Cited

U.S. PATENT DOCUMENTS

| | | | |
|---|---|---|---|
| 5,621,325 | 4/1997 | Draper et al. | 324/326 |
| 5,917,325 | 6/1999 | Smith | 324/326 |
| 5,920,194 | 7/1999 | Lewis et al. | 324/326 |

FOREIGN PATENT DOCUMENTS

WO 96/29615  3/1996  WIPO.

*Primary Examiner*—Gerard Strecker
*Attorney, Agent, or Firm*—Woodbridge & Associates, P.C.; Richard C. Woodbridge

[57] ABSTRACT

If a solenoid is mounted on an underground object, such as a boring tool, magnetic fields generated by an electric current flowing through that solenoid can be detected by a suitable detector at or above the surface. If the axis of the solenoid is tilted, the maximum value of the field is not directly above the solenoid. Therefore, the present invention makes use of measured values of horizontal and vertical components of the magnetic field to determine the separation of the detector and the solenoid, and also, by making use of a tilt sensor associated with the solenoid to derive a prediction of the ratio of the horizontal and vertical components of the field at a position vertically above or below the solenoid. If that predicted value of the ratio is then compared with the measured value of the ratio, the two will coincide when the detector is vertically above the solenoid. Thus, by moving the detector until such coincidence is obtained, the position of the solenoid can be determined.

7 Claims, 7 Drawing Sheets

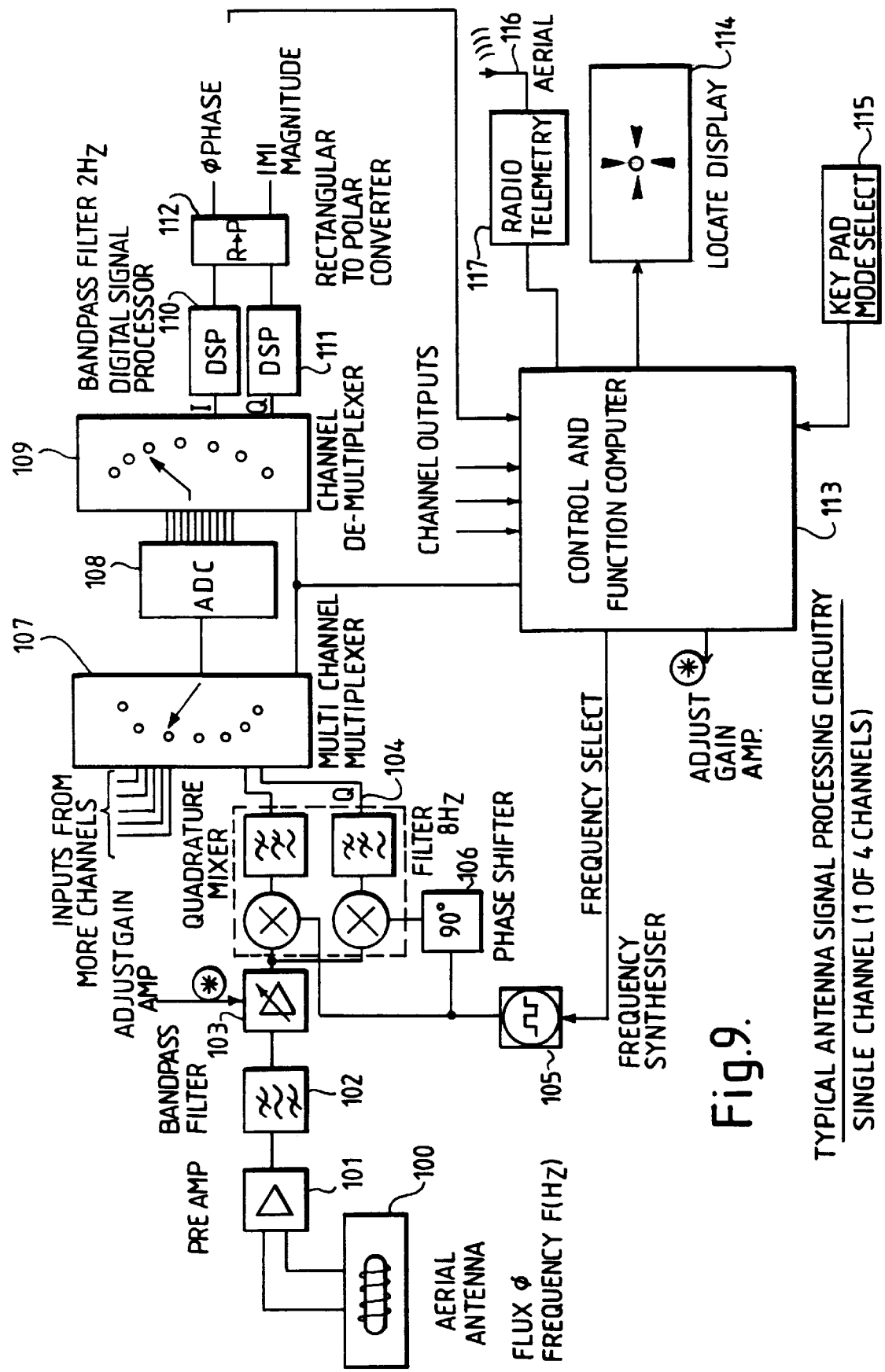

LOCATING AN INACCESSIBLE OBJECT BY DETECTING HORIZONTAL AND VERTICAL COMPONENTS OF A MAGNETIC FIELD

BACKGROUND OF THE INVENTION

1. Field of the Invention

The present invention relates to a method for locating inaccessible objects, particularly, but not exclusively, for locating underground boring tools.

2. Summary of the Prior Art

When locating underground objects it is known to arrange for a magnetic field to be generated by the object or by a field source attached thereto. In the case of underground conductors such as cables or pipes, an alternating current can be applied to the conductor to induce a cylindrical magnetic field with a detectable field strength at ground level. By measuring the variation of the field strength at the surface, the path of the underground conductor can be determined.

The locating of objects such as sub-surface boring tools cannot normally be performed in this way because a cylindrical field cannot be generated. Instead a magnetic field source is mounted on the boring tool and the field from that field source is detected. This field source can be a solenoid. When alternating current flows through the solenoid a bipolar magnetic field is generated which can be located at the surface by a person with a hand-held detector. The vertical component of the field at the surface will change direction when the field detector is directly above the solenoid, assuming the solenoid is horizontal. Therefore by noting the position in which that component of the field reverses the position of the solenoid in a horizontal plane can be determined. If this is done continuously, the movement of the boring tool on which the solenoid is mounted can be tracked. The depth of the solenoid can also be gauged by measuring the attenuation of the field at the surface. Of course, this requires the field strength at the solenoid to be known.

In WO 96/29615, we described the location of an inaccessible object by detecting the magnetic field generated by a solenoid at a remote site, making use of the relationship between the ratio of the axial and radial magnetic fields at any point in the plane containing the axis of the solenoid and the angle between the axis of the solenoid and the line joining the point to the centre of the solenoid. Where the orientation of the solenoid may change, as in an underground boring tool, it was then necessary for the boring tool to incorporate a tilt sensor to determine the orientation of the solenoid relative to the horizontal. This enabled the axial and radial fields to be determined from the fields measured.

SUMMARY OF THE INVENTION

Unfortunately, the arrangements described in WO-A-96/29615 are least accurate when the detector is close to the position vertically above the solenoid. This is also the point at which the results are most affected by the tilt of the solenoid. Therefore, the present invention seeks to provide an arrangement for enabling a detector to be moved to a position vertically above (or possibly vertically below) an inaccessible object carrying a solenoid.

At its most general, the present invention proposes that a detector detects the vertical and horizontal fields from the solenoid of the inaccessible object and this information is processed to predict the ratio of the vertical and horizontal fields at a position vertically above (or below) the solenoid. The predicted and measured values of the ratio are compared, and the detector moved until the predicted and measured values coincide. At this point, the detector is vertically above the solenoid. In determining the prediction of the vertical and horizontal fields, account must be taken both of the distance between the detector and the solenoid and the tilt of the solenoid.

Thus, the vertical and horizontal field strengths are measured using a detector having at least one vertical, and at least one horizontal, detecting antenna. From those measurements, the ratios of the field strengths are determined, as is the distance between the detector and the solenoid. Also obtained is the tilt of the solenoid, which should be derived from e.g. a tilt sensor mounted on the inaccessible object. Using those measurements, a prediction of the ratio of the vertical and horizontal field strengths directly above (or below) the solenoid can be determined and compared with the measured value of the ratio. The operator then moves the detector towards the solenoid (towards a position vertically above (or below) the solenoid). When the predicted and measured values coincide, the detector is vertically above (or below) the solenoid.

In such an arrangement, there normally needs to be an established relationship between at least the horizontal antenna of the detector and the solenoid, so that the orientation of the fields of the solenoid and the horizontal coil antenna are the same. This enables the detector to be given the correct orientation relative to the solenoid, since otherwise the comparison of the predicted and measured values of the horizontal and vertical fields may not coincide at the right place, at least when the solenoid is tilted.

When the detector has the right orientation, it must be moved "towards" the solenoid. Again, that direction needs to be determined. There are several ways of doing this. For example, when the concealed object is a boring tool moving from an initial position to a final position, the operator may start with the detector at the initial position, and move towards the final position or vice versa. However, this is not always practical. Alternatively, the detector may measure the field strengths from the solenoid, detect movement of the detector relative to the boring tool, and compare the measured field strengths at successive locations. If the field strength is increasing, the detector is moving towards the solenoid. Another alternative however, is to make use of the measured ratio of vertical to horizontal field strengths and the predicted value of that ratio directly above the solenoid. The variation of those two values away from the position directly above the solenoid is predictable, and can be used to determine the direction towards the solenoid. This arrangement has the advantage that it does not involve comparison between measured values of the field strengths.

A further complication is that, for some tilt angles of solenoid, there may be a position which is not directly above the solenoid, but for which the measured and predicted values of the ratio of field strengths nevertheless coincide. If that position exists at all, it is relatively remote from the solenoid. Therefore, it is preferable that a detection region is defined proximate the point directly above the solenoid, and an arrangement is provided for detecting when the detector is within that detection region, or for permitting operation of the detector only within the detection region. Then, provided the operator moves only within that detection region, there is only one point at which the measured and predicted values of the ratio coincide.

BRIEF DESCRIPTION OF THE DRAWINGS

An embodiment of the present invention will now be described in detail, by way of example, with reference to the accompanying drawings, in which:

FIG. 9 is a schematic block diagram of a circuit for the detection of FIG. 8.

DETAILED DESCRIPTION

Figure 1:
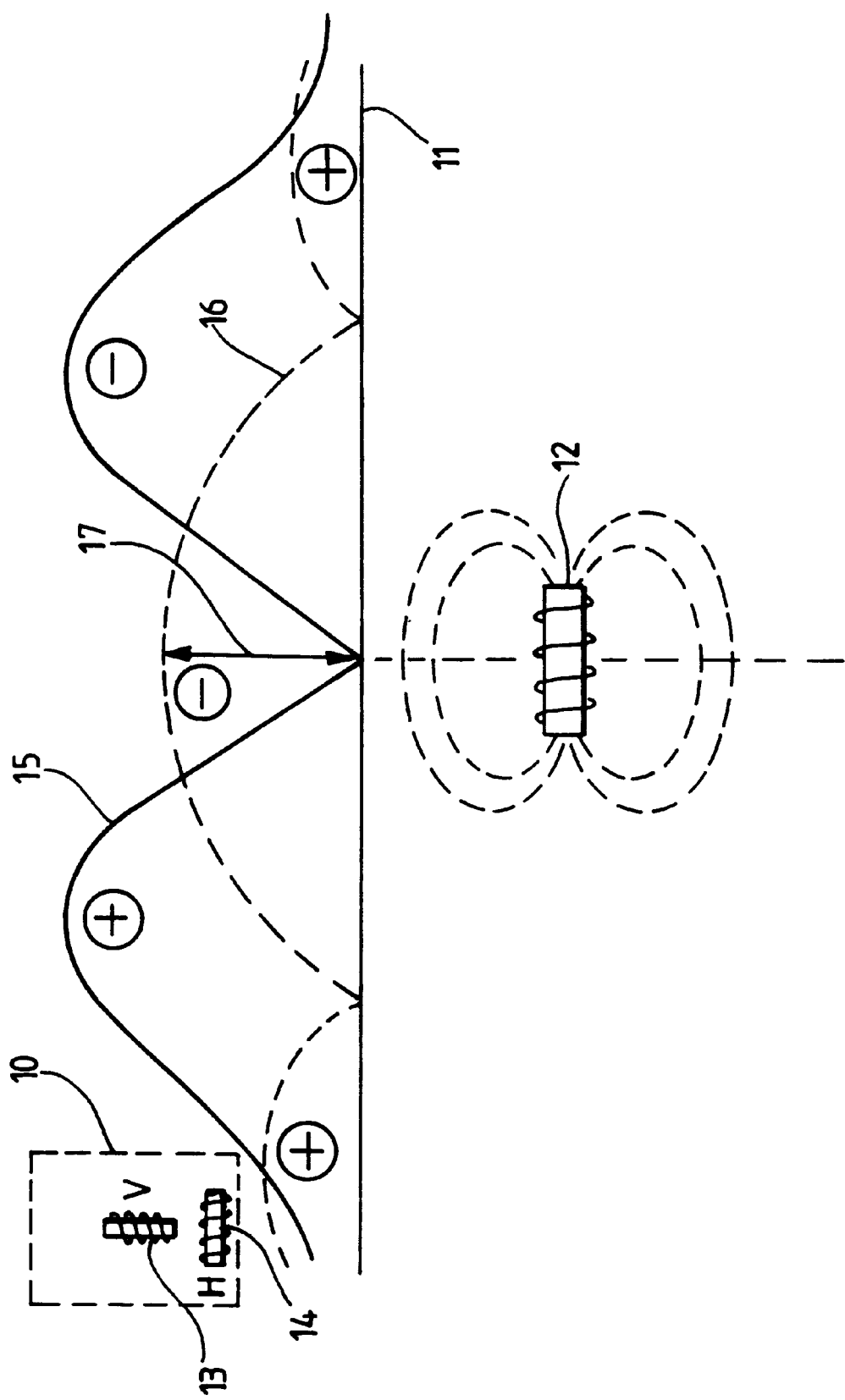
FIG. 1 is a schematic diagram showing the location of magnetic fields above a current-carrying solenoid.

The reason why the present invention is needed will first be discussed with reference to FIGS. 1 and 2. FIG. 1 shows the magnetic field patterns which are detectable by detector 10 above ground surface 11, when there is a coil 12 below the ground surface 11. In FIG. 1, the axis of the coil 12 is horizontal. The detector 10 has a vertical antenna 13 and a horizontal antenna 14 (which themselves may be in the form of one or more coils). The field pattern detected by the vertical antenna 13 above the ground surface 11 is then shown by solid line 15 and the field detected by the horizontal antenna 14 is shown by dotted line 16. It can be seen that the field detected by the horizontal antenna 14 has a maximum value illustrated by arrow 17 vertically above the coil 12. The position of that maximum value occurs at a point between two maxima of the field detected by the vertical antenna 13.

Figure 2:
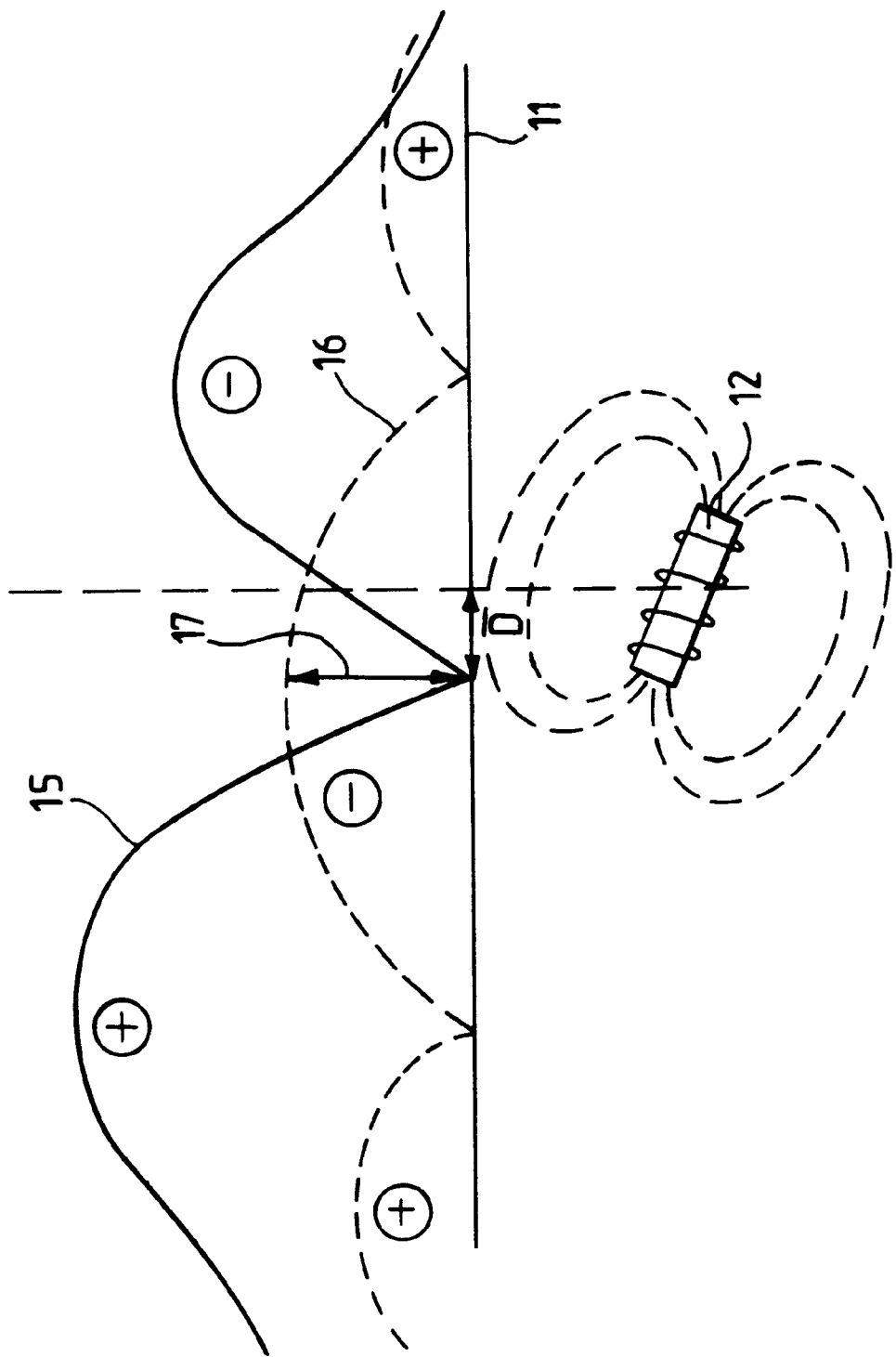
FIG. 2 is similar to FIG. 1, but with the solenoid tilted.

FIG. 2 illustrates the situation when the coil 12 is tilted from the horizontal. With the antenna 12 tilted, the horizontal antenna 14 still detects a maximum value corresponding to arrow 17, and that maximum value occurs between two maxima of the field detected by the vertical antenna 13. However, with the coil tilted, the position of the maximum of the field detected by the horizontal antenna 14, corresponding to arrow 17, is displaced by a distance D from the position directly above the coil 12. Thus, if reliance was made solely on that maximum, corresponding to arrow 17, then an error would be made in determining the position of the coil 12.

The present invention therefore seeks to provide a way of correcting for displacement D, based on the field strengths measured by the vertical and horizontal antennae 13,14 of the detector 10 when passing over a coil 12. It can be noted that, in FIGS. 1 and 2, it is assumed by the ground surface 11 is horizontal, but this need not be the case and the present invention is applicable to situations in which the ground is itself tilted to the horizontal. Moreover, the detector itself need not be vertical, provided its tilt is known. If the detector is tilted, so that the antennae 13, 14 are not vertical and horizontal respectively, then the signals detected by those antennae 13, 14 must be corrected by use of the tilt angle of the detector to determine the horizontal and vertical field strengths.

With the present invention, the horizontal and vertical field strengths are measured using antennae 13,14 and the ratio of the measurements determined. As will be described in more detail subsequently, by using information corresponding to the tilt of the solenoid 12, and the distance between the detector 10 and the solenoid 12, it is possible to predict what the ratio of the vertical to horizontal field would be if the detector 10 was positioned vertically above the solenoid 12. Measured and predicted values can therefore be compared. When they coincide, the detector 10 is vertically above the solenoid 12. The determination of the predicted value of the ratio can take into account the shifting of the vertical and horizontal fields illustrated in FIG. 2 when the solenoid 12 is tilted from the horizontal, and so can produced an estimate which coincides with the measured value when the detector 10 is, in fact, directly above the solenoid 12.

The determination of the actual and predicted ratios of vertical to horizontal fields will now be discussed. Note that the "predicted" or "target" ratio is the predicted ratio directly above the solenoid 12, whilst the actual ratio is that measured at the current location of the detector. The first step is to measure, at the detector, the field strengths on the horizontal and vertical axes. These are given by the following two equations:

$$SAmp(r, \theta) := \frac{1}{r^3} \cdot \left( \frac{3 - \cos(2 \cdot \theta)}{4} \right)$$

$$SVec(\theta) := \left( \cos(2 \cdot \theta) + \frac{\cos(4 \cdot \theta)}{2.2}, \sin(2 \cdot \theta) + \frac{\sin(4 \cdot \theta)}{2.2} \right)$$

Then it is necessary to define the properties of the detector 10.

| | |
|---|---|
| tip: = 0.05 | Tip to B_V distance |
| B_Voff: −0.069 | Ground to B_V |
| T_Ooff: = 0.753 | Ground to T_O |
| B_Vpos$_n$: = (pos$_n$ depth$_n$ + B_Voff) | B_O position |
| T_Opos$_n$: = (pos$_n$ depth$_n$ + T_Ooff) | T_O position |
| B_Vvec$_n$: = (0 1) | B_V vector |
| T_Ovec$_n$: = (1 0) | T_O vector |

In the above equations, n is the current measurement point and in the subsequent discussions it is assumed that there are N such measurement points. This number is, of course, arbitrary since each measurement point corresponds to a particular position of the detector 10 relative to the solenoid 12.

Then, it is necessary to define a correction matrix which corrects the measurements for tilt.

$$T_n := \begin{pmatrix} \cos(-tilt_n) & \sin(-tilt_n) \\ -\sin(-tilt_n) & \cos(-tilt_n) \end{pmatrix}$$

Thus:

$$B\_Vp_n := B\_Vpos_n \cdot T_n$$

$$B\_Vv_n := B\_Vvec_n \cdot T_n$$

Thus:

$$B\_Vr_n := \sqrt{[(B\_Vp_n^T)_0]^2 + [(B\_Vp_n^T)_1]^2}$$

Also:

$$T\_0P_n := T\_0pos_n \cdot T_n$$

$$T\_0v_n := T\_0vec_n \cdot T_n$$

$$T\_0r_n := \sqrt{[(T\_0p_n^T)_0]^2 + [(T\_0p_n^T)_1]^2}$$

$$B\_Vang_n := \mod\left[5 \cdot \frac{\pi}{2} + \text{Atan}[(B\_Vp_n^T)_1, (B\_Vp_n^T)_0], 2 \cdot \pi\right]$$

This gives B_V for the angle of tilt of the solenoid 12.

$$T\_0ang_n := \mod\left[5 \cdot \frac{\pi}{2} + \text{Atan}[(T\_0p_n^T)_1, (T\_0p_n^T)_0], 2 \cdot \pi\right]$$

This gives T_0 for the angle of tilt of the solenoid 12. Then the detected signals are analysed $$B\_V_n := SAmp(B\_Vr_n, B\_Vang_n) \cdot \Sigma(B\_Vv_n \cdot SVec(B\_Vang_n)^T)$$

$$T\_0_n := SAmp(T\_0r_n, T\_0ang_n) \cdot \Sigma(T\_0v_n \cdot SVec(T\_0ang_n)^T)$$

From, the above calculations, the field strength magnitude at point n can be calculated from the following equation:

$$mag_n := \sqrt{(B\_V_n)^2 + (T\_0_n)^2}$$

Furthermore, the ratio of the measured horizontal to vertical field strength is then given by:

$$Act\_ratio_n := \frac{B\_V_n}{(T\_0)_n}$$

In the present embodiment, the relationship between magnitude, and target ratio (for the point directly above the solenoid 12) are recorded for various tilt angles in appropriate tables. The size of these tables may depend on the available memory space but, as will be described subsequently it is possible to interpolate within the values in the tables. Moreover, although the tables should, in theory, contain values of all possible tilts, and all possible distances, this is found not to be necessary in practice. At least when the present invention is applied to a boring tool, tilt angles of ±45° represent the normal permitted range, and depths up to 30 m represent the normal range of depths. From those constraints, suitable tables can be obtained.

In the subsequent discussions, these tables are defined as follows:

| | |
|---|---|
| mag_table: = READPRN (magtab) | Magnitude Table for depth |
| rat_table: = READPRN (rattab) | Target ratio table |
| A: = cols (rat_table) | The number of tilt values |
| M: = rows (rat_table) | The number of depth values |

This terminology is derived from the Mathcad program produced by Microsoft Inc. the tables are a matrix of solutions to the mathematical model previously described. In particular, Mag_table is used to determine an estimate for depth from inputs of horizontal and vertical antennae and the tilt angle of the solenoid. Rat_table is used to determine the target ratio when directly above (or below) the solenoid using an estimated depth derived from the mag_table and the tilt.

Then it is necessary to determine the brackets for tilt $$tilt\_high_n := \sum_a if(a = 0, 0, if(mag\_table_{0,a-1} < an_n,$$
$$if(mag\_table_{0,a} \geq an_n, a, 0), 0))$$

$$tilt\_low_n := tilt\_high_n - 1$$

Then calculate the interpolation ratio for tilt $$high\_mix_n := \frac{an_n - mag\_table_{0,tilt\_low_n}}{mag\_table_{0,tilt\_high_n} - mag\_table_{0,tilt\_low_n}}$$

Next generate the depth and ratio tables:

$$depth\_table_{n,m} := mag\_table_{m,tilt\_high_n} \cdot high\_mix_n + mag\_table_{m,tilt\_low_n} \cdot (1 - high\_mix_n)$$

$$ratio\_table_{n,m} := rat\_table_{m,tilt\_high_n} \cdot high\_mix_n + rat\_table_{m,tilt\_low_n} \cdot (1 - high\_mix_n)$$

Then find the brackets for depth $$depth\_high_n := \sum_m if(m < 2, 0, if(depth\_table_{n,m-1} > mag_n,$$
$$if(depth\_table_{n,m} \leq mag_n, m - 1, 0), 0))$$

$$depth\_low_n := depth\_high_n + 1$$

Then the interpolation ratio for tilt is calculated $$depth\_mix_n := \frac{mag_n - depth\_table_{0,depth\_low_n}}{depth\_table_{0,depth\_high_n} - depth\_table_{0,depth\_low_n}}$$

Next the perceived depth is calculated $$Est\_depth_n := depth\_mix_n \cdot mag\_table_{depth\_high_n,0} + (1 - depth\_mix_n) \cdot mag\_table_{depth\_low_n,0}$$

Finally the target ratio is calculated $$Targ\_ratio_n := depth\_mix_n \cdot ratio\_table_{n,depth\_high_n} + (1 - depth\_mix_n) \cdot ratio\_table_{n,depth\_low_n}$$

The target ratio is then the predicted value of the ratio of vertical to horizontal field strengths for position n and thus may be compared directly with the actual ratio determined as previously described.

Figure 3:
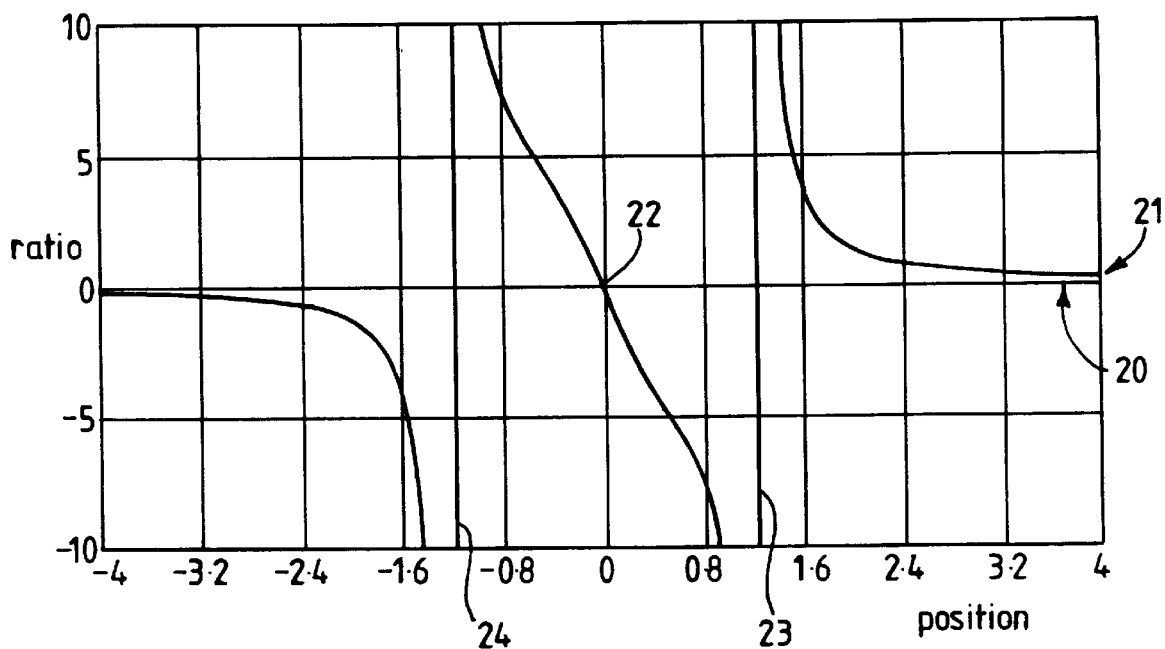
FIG. 3 is a graph showing the variation of the ratio of vertical to horizontal fields with distance from the point vertically above the solenoid, with the solenoid being as shown in FIG. 1.
Figure 4:
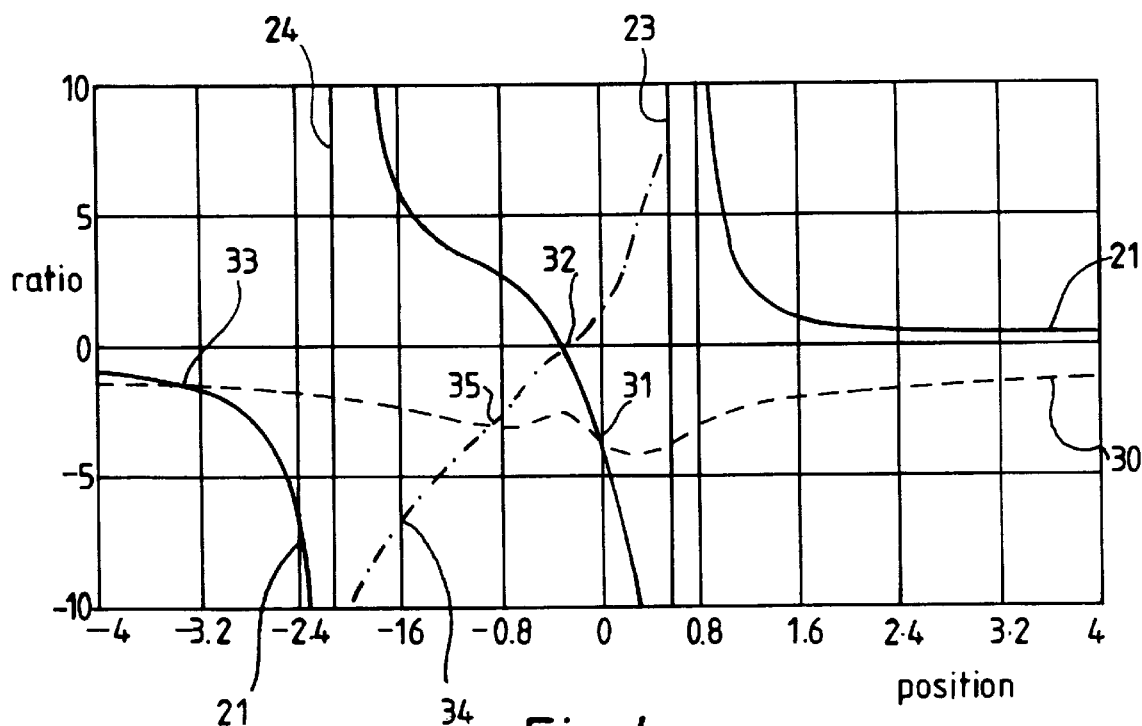
FIG. 4 is a graph similar to FIG. 3, but with the solenoid tilted as in FIG. 2.

FIGS. 3 and 4 illustrate the relationship between the measured ratio of the vertical and horizontal field and the predicted values of that ratio vertically above the solenoid 12 in FIGS. 1 and 2. In FIG. 3, the solenoid 12 is horizontal, as in FIG. 1, and therefore it is possible to say that the predicted ratio should always be zero, as indicated by dotted line 20 since the vertical field is zero directly above the solenoid 12. The measured value, indicated by solid line 21, then varies. As can be seen from FIGS. 3 and 4, the measured values tend to infinity at two points, 23 and 24, where there are no real solutions of the measured value. As can be seen, points 23, 24 where the measured value tends to infinity (those points will hereafter be referred to as "infinities" for the sake of convenience) occur at positions spaced from the position directly above the solenoid 12, and correspond to the zero points of the horizontal field illustrated by dotted line 16 in FIGS. 1 and 2, with the measured value of the ratio corresponding to solid line 21 crossing the predicted value corresponding to dotted line 20 only at position 22 which is vertically above the solenoid 12.

The position is much more complex when the solenoid 12 is tilted, as in FIG. 2. This is illustrated in FIG. 4. Since the predicted value of the ratio is derived from measurements of the actual values of the vertical and horizontal fields, the predicted value itself varies with the current position of the detector 10 relative to the solenoid 12. This is illustrated by dotted line 30. As can be seen, the dotted line 30 does not follow the line where the ratio is zero, unlike in FIG. 3. Nevertheless, the predicted value of the ratio represented by dotted line 30 still crosses the solid line corresponding to the measured value of the ratio at a point 31 which is vertically above the solenoid 12. However, at that point 31, the ratio is not zero, as can be seen by consideration of FIG. 2. The ratio is zero at the position of arrow 17, which corresponds to the position 32 in FIG. 4, but FIG. 2 makes clear that this point is not directly above the solenoid 12, but is displaced at distance D. As has previously been mentioned, the shape of the dotted line 30, representing the predicted values of the ratio, will vary with tilt of the solenoid 12. As the tilt of the solenoid increases, the line 30 moves away from the zero value of the ratio represented by dotted line 20 in FIG. 3.

Thus, at least for measurements between the infinities 23,24 of the ratio shown in FIGS. 3 and 4, movement of the detector 10 towards the solenoid 12 will cause the measured and predicted values to approach each other, until they coincide with the detector 10 directly above the solenoid 12. There is no need for previous values of the ratio to be stored, since a predicted value can be derived from each measurement, and the position where the detector 10 is vertically above the solenoid 12 is identified only when there is coincidence.

However, FIG. 4 illustrates a problem for some values of tilt of the solenoid 12, namely that there may be a point 33 remote from the position vertically above the solenoid 12 at which the predicted value of the ratio represented by line 30 coincides with the measured value represented by the solid line 21. If initial measurements were made close to that point 33, the determination of the position of the solenoid 12 may be erroneous.

Therefore, it is necessary to eliminate such faulty coincidences, which can only occur outside the region defined by the infinities 23,24. Therefore, it is preferable to have a way of determining that measurements are within those infinities 23,24. There are several ways of doing this. One simple way is to detect the position of the infinities 23,24 themselves, and only start to compare the measured and predicted values of the ratios only when an infinity has been crossed by the detector. Of course, once the infinity has been crossed, the movement of the detector 10 must be towards the solenoid 12, to prevent erroneous results due to detection of an asymptote 23,24 and then movement away from the solenoid 12, which could result in the detector 10 arriving at position 33 in FIG. 4.

Another way is to make use of values derived from estimates of the depth of the solenoid 12. This method uses four values namely:

$$Value1 \quad pit_n := \frac{Est\_depth_n}{20}$$

$$Value2 \quad pim_n := \frac{Est\_depth_n}{20}$$

$$Value3 \quad pit\_extn_n := \frac{20}{Est\_depth_n}$$

-continued $$Value4 \quad pit\_ext_n := \frac{20}{Est\_depth_n}$$

These four values are chosen because they create reliable mode changeover control functions, so that the detector can detect when it passes through the infinities 23,24. Of course, in practical situations, measurement accuracy, interference and noise must all be taken into account.

Figure 5:
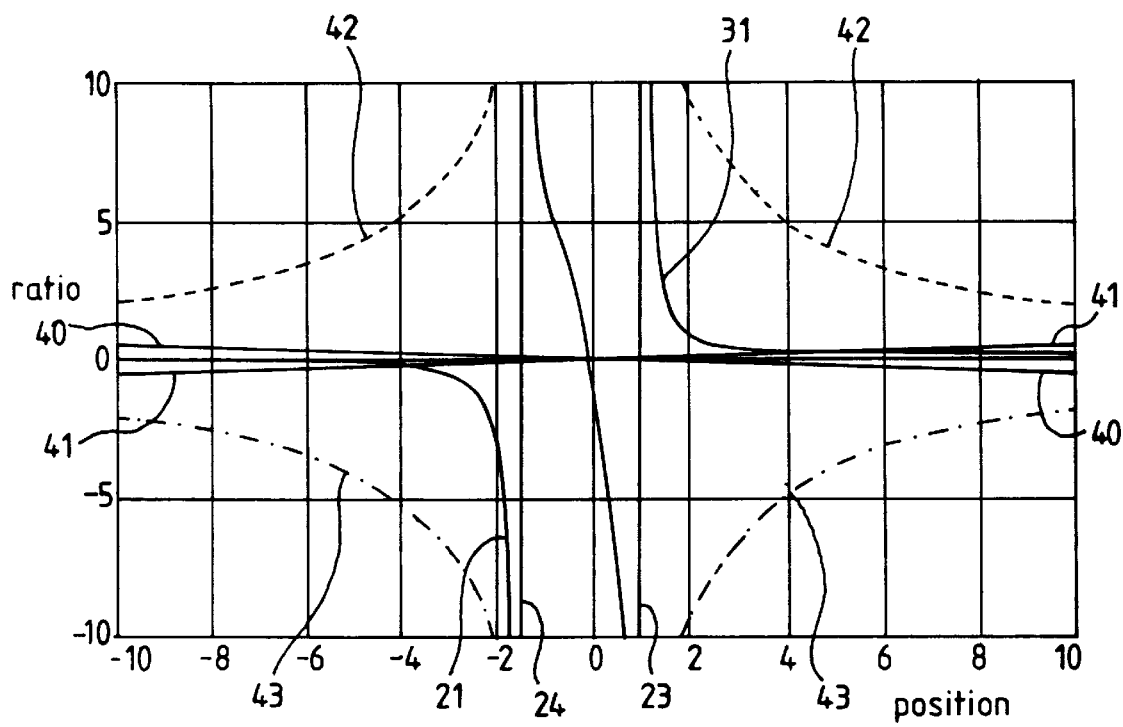
FIG. 5 is a graph similar to FIG. 3, but with reference values marked thereon.

The four values are functions of estimated depth, and thus can be added to the graph of FIG. 3, as shown in FIG. 5. In FIG. 5, value 1 is shown by line 40, value 2 by solid line 41, value 3 by dotted line 42, and value 4 by chain line 43.

Then, if the detector is on the positive side of the solenoid 12 when detection starts, then the detector is triggered when the measured value of the ratio of the vertical to horizontal fields is between values 1 and 3 (curves 40 and 42). As can be seen, this is necessary on the negative side of infinities 23. Similarly, if the detector starts on the negative side of the solenoid 12, then the detector is triggered when the measured value of the ratio is between values 2 and 4. Again, as can be seen from FIG. 5, this is necessarily less negative than infinities 24.

This arrangement, and indeed the relationships illustrated by FIGS. 3 and 4, depend on a convention for expressing the direction of the horizontal coil 14 of the detector 10 relative to the solenoid 12. The fields represented by lines 15 and 16 in FIGS. 1 and 2 have different phases at different distances from the solenoid 12, which are indicated by circled negative and positive signs in FIGS. 1 and 2. The calculation of the estimated value of the ratio has to assume relative orientation of the horizontal antenna 14 and the solenoid 12, and it is preferable to say that the two are aligned when they have the same direction of spiral. This enables the detector 10 to be oriented correctly as it is moved towards the solenoid 12. If it were oriented with the horizontal antenna 14 in the opposite direction, the measured value of the ratio would correspond approximately to the chain line 34 in FIG. 4, which crosses the line 30 representing the predicted ratio at a point 35 which is not directly above the solenoid 12. Of course, it would be possible to alter the calculation of the predicted value of the ratio on the assumption that the horizontal antenna 14 and the solenoid 12 were in anti-alignment, and this would move the position of dotted line 30 in FIG. 4 to a position in which it coincided with the chain line 34 when the detector 10 was directly above the solenoid 12. The choice of alignment or anti-alignment is thus possible, but only when the calculation of the predicted value is adjusted accordingly.

The calculation of the predicted value of the ratio also depends on a measurement of the distance from the detector 10 to the solenoid 12. There are many ways of obtaining an appropriate distance value. If the magnetic field strength of the solenoid 12 is known, then the decrease of field strength with distance from the solenoid is also predictable, and therefore measuring the field strength at any point gives a measure of the distance from the detector 10 to the solenoid. If the field strength of the solenoid is not known, two field strengths may be made a known distance apart, and the field strength at the solenoid can then be determined.

Figure 6:
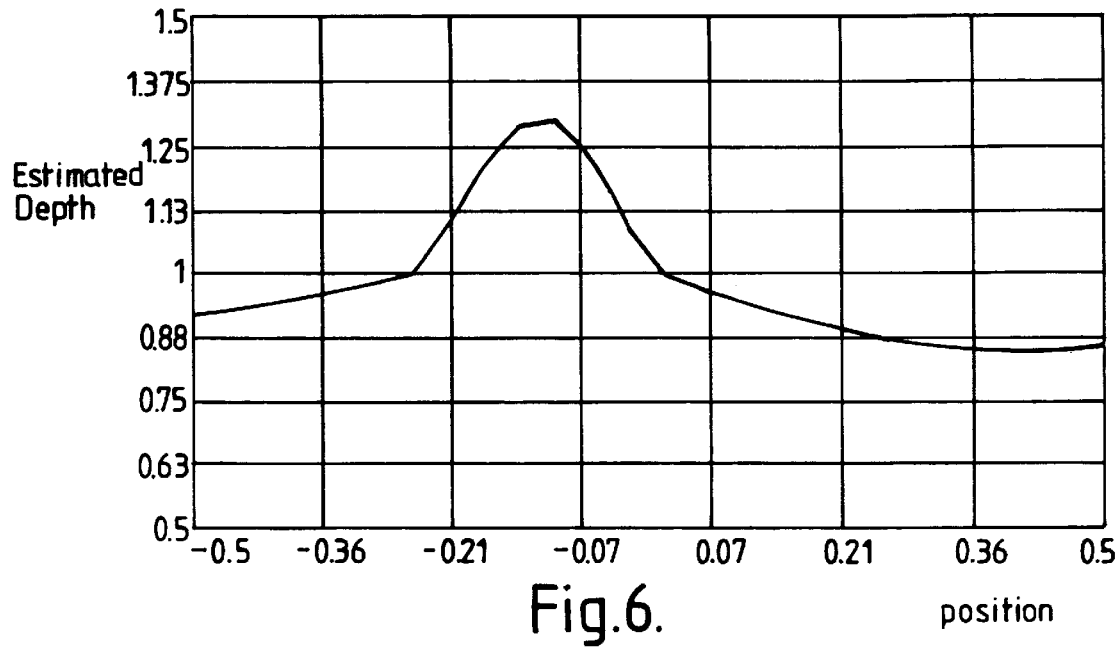
FIG. 6 is a graph showing the variation of estimated depth with position.

At positions very close to the position vertically above the solenoid (e.g. within less than 0.2 m), the estimated value of the depth varies significantly with the position, and this causes a significant change in the value of the predicted ratio. This is illustrated in FIG. 6. FIG. 6 illustrates the case where the depth is 1.0 m. As shown in FIG. 6, at positions close to the position directly above the solenoid 12, variation in estimated depth with position is very large. For the 1.0 m depth, in a region of ±0.02 m, the estimate of depth is variable +25% to −28%. Thus, any small change in position significantly affects the other factors which depend on that estimated depth.

If absolute accuracy is wanted, the operator of the detector 10 may spend a long time trying to get to a position exactly above the solenoid 12, since the measurement is very critically position sensitive. However, for most practical concealed objects, such as boring tools, a determination of position to ±0.2 m is sufficiently accurate for practical purposes. Therefore, it may be better to indicate to the operator when a region of ±0.2 m "over" the solenoid 12 is reached, and then to re-calculate the depth as if the detector 10 was, in fact, directly above the solenoid, so that an accurate depth reading can be obtained.

Figure 7:
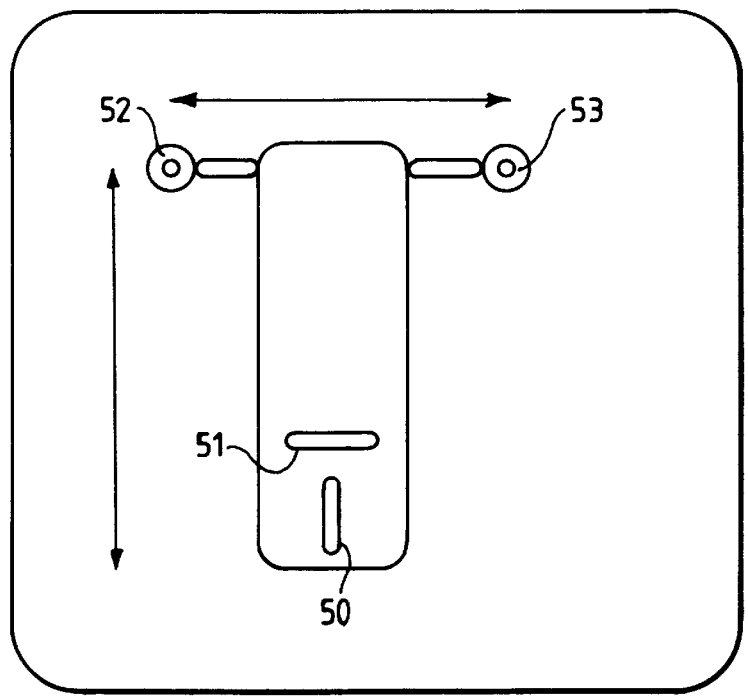
FIG. 7 shows the aerial array of the detector of FIG. 1.

FIG. 7 shows in more detail the aerial arrangement within the detector 10. As shown in FIG. 7, there is a vertical aerial 50, a horizontal aerial 51, which in use, will be arranged so that it is perpendicular to the direction towards the solenoid 12, and two in-line horizontal aerials 52,53, the axis of which are thus directed towards the solenoid (or more strictly, towards a point above the solenoid).

Using this aerial arrangement, it is possible to detect the vertical and horizontal fields, as previously described, but also to ensure that the aerial arrangement is properly oriented relative to the solenoid. Such orientation measurements is a conventional signal processing, and therefore will not be described in detail.

Figure 8C:
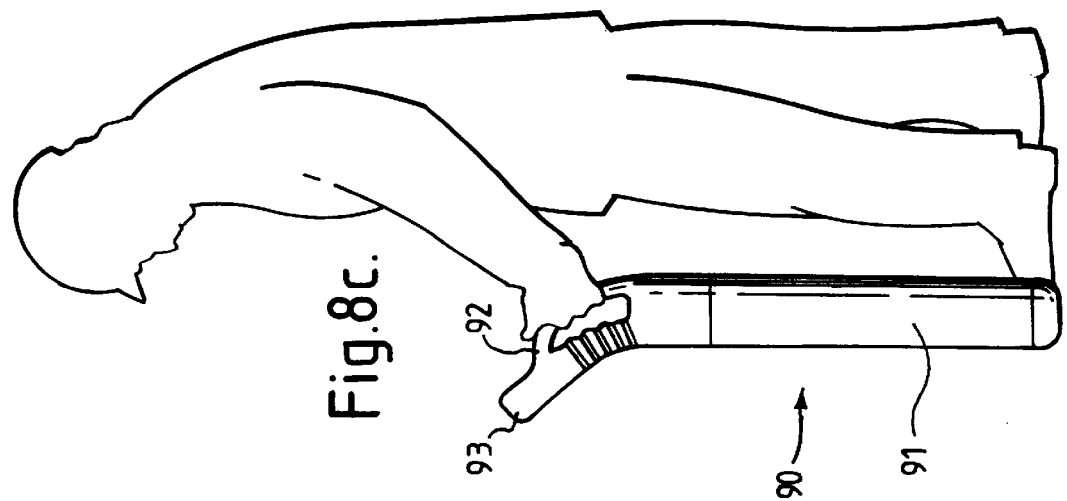
FIGS. 8a to 8c show the external appearance of an example of a practical implementation of the detector of FIG. 1.
Figure 8B:
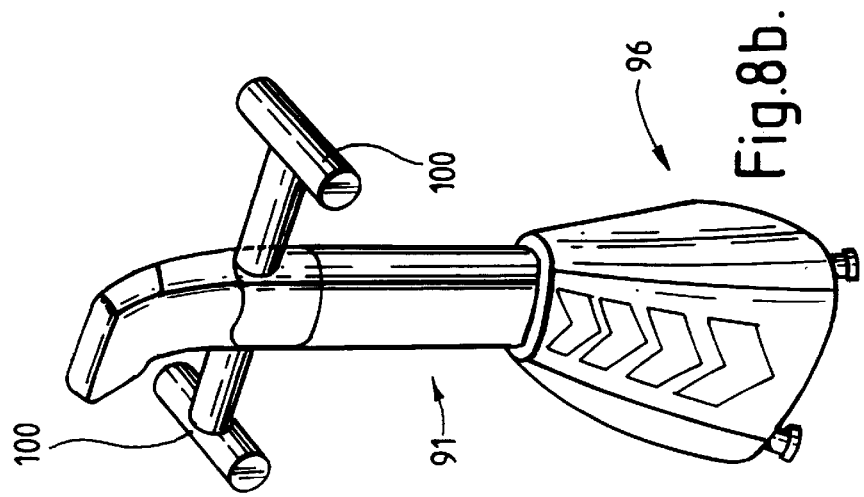
Figure 8A:
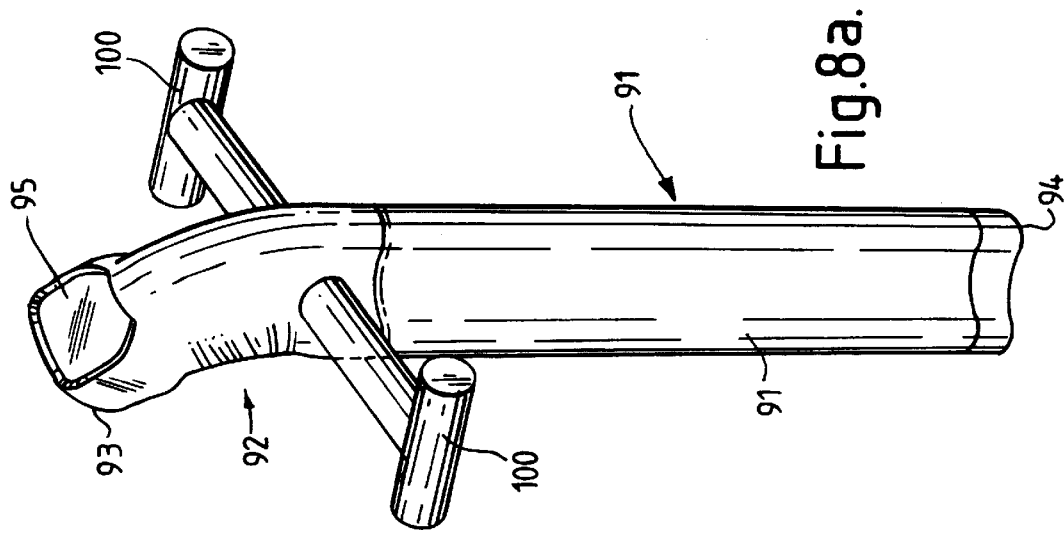

The antenna array of FIG. 7, together with suitable signal processing circuitry, may be housed in a hand-held unit. Referring to FIGS. 8a to 8c such a hand-held unit has a casing 90 with a main part 91 housing the receiver of FIG. 7, a handle 92, a display part 93 and projections 100 carrying the in-line aerials 52,53 of FIG. 7.

The housing 90 may be combined with a conventional hand-held locator structure to facilitate preliminary location of the boring tool. The locator utilises the arrays 20 and 21 to detect and locate the preliminary location using techniques already known in this field.

FIG. 8a shows the structure of the unit 90 in more detail. The main part 91 of the unit 90 may be an extrusion, with an injected moulded foot 94 at one end thereof. The display part 93, and the handle 92, are formed by injection moulding. FIG. 8a also shows that the display part 93 has a display screen 95 to permit the operator to receive information.

When the location has been established, the unit 90 can then be dropped into a base housing 96, as shown in FIG. 8b. The base housing is then positioned and aligned as the datum for the on-going tracking of he boring tool by means of its solenoid coil 30.

The signal processing circuitry for analysing the outputs of the antenna array of FIG. 7 is shows in FIG. 9. As can be seen from FIG. 9 , the output of an antenna 100, which may be any one of the aerials 50 to 53, has its output passed via a pre amplifier 101, a band pass filter 102, and a gain adjustment amplifier 103 to a quadrature mixer 104. That mixer 104 receives two signals from a synthesiser 105, with one signal being phase shifted by 900 from the other by a phase shifter 106. As can be seen, the mixer 104 contains filters. The two outputs of that mixer 104, being derived from the signal from the amplifier 103 mixed respectively with the two signals from the synthesiser 105 provides inputs to a multiplexer 107. That multiplexer 107 will receive similar input from other input channels from other aerials 50 to 53 of the antenna array, those other input channels having similar components 101 to 106.

The multiplexer 107 passes the signals received via an analog/digital converter 108 to a de-multiplexer 109, so that the two outputs of mixer 104 of an appropriate channel are passed via respective digital signal processors 110, 111 to a converter 112, which coordinates the signals from rectangular to polar converters to derive phase and magnitude signals which are then input to a computer 113. The components 110 to 112 form an output channel, with similar output channels being provided for the respective aerials 50 to 53, so that the computer 103 receives inputs from each aerial 50 to 53. The computer 113 also affects the input channel by controlling the frequency of the synthesiser 105, and the gain of amplifier 103, for each channel. The frequency may be varied to optimise the balance between electromagnetic interference and field distortion, the former improving with high frequency and the latter improving with low frequency. The gain may be adjusted to minimise the effect of noise over the full signal dynamic range, enabling the use of inexpensive components.

The computer then carries out the processing described previously to determine the target ratio, to compare that target ratio with the actual ratio, and also to carry out the processing described with reference to FIGS. 5 and 6. The computer generates an output to a display 114 which then may indicate to the user when the unit 90 is directly above the solenoid 12, at which point the unit 90 can be dropped into its base housing 96.

The computer is also connected to a key pad 115 to enable the user to input commands to the computer 113, and may also be connected to an output aerial 116, via suitable radio telemetry circuitry 117 to enable signals to be passed to a remote site.

What is claimed is:

1. A method of determining the relationship between a detector and an inaccessible object, the inaccessible object having means for generating a magnetic field, the method comprising the steps of:

a) detecting horizontal and vertical components of said magnetic field generated by said generating means, said detecting being by using said detector located within detecting range of said object;

b) determining the ratio of said horizontal and vertical components detected;

c) determining the separation of the detector and the object from the detected horizontal and vertical components;

d) determining the tilt relative to one of said components of the object;

e) deriving from the tilt a prediction of the ratio of horizontal and vertical components of said magnetic field at a position vertically above or below the object, at a separation from the object corresponding to the separation determined at step (c); and f) comparing the ratio of the horizontal and vertical components determined at step (b) with the ratio of the horizontal and vertical components predicted at step (e) to determine the relationship between the detector and the inaccessible object.

2. A method according to claim 1, further including repeating steps (a) to (f) for successive positions of detector until the determined and predicted ratio of the horizontal and vertical components coincide.

3. A method according to claim 2, wherein the detected horizontal and vertical field strengths are compared for the successive positions of the detector, thereby to determine whether the movement of the detector is towards or away from the object.

4. A method according to claim 1, wherein a detection region is defined around the object, and the method further includes determining when the detector is within the detection region.

5. A system for determining the relationship between a detector and an inaccessible object, comprising:

generating means associated with the inaccessible object for generating a magnetic field;

sensor means associated with the object for determining the tilt relative to a horizontal or a vertical component of the object;

means associated with the detector for detecting the horizontal and vertical components of the magnetic field; and processing means for determining the ratio of the detected horizontal and vertical components, determining the separation of the detector and the object from the detected horizontal and vertical components, deriving from the tilt a prediction of the ratio of the horizontal and vertical components of the magnetic field at a position vertically above or below the object, at a separation from the object corresponding to the determined separator, and comparing the ratio of the detected horizontal and vertical components with the predicted ratio of the horizontal and vertical components to determine the relationship between the detector and the inaccessible object.

6. A system according to claim 5, further including means for defining a detection region around the object.

7. A system according to claim 6 for inhibiting operation of said processing means when the detector is outside the detection region.

* * * * *